United States Patent
Louven et al.

(10) Patent No.: US 9,534,556 B2
(45) Date of Patent: Jan. 3, 2017

(54) METHOD AND DEVICE FOR OPERATING AN INTERNAL COMBUSTION ENGINE

(71) Applicant: Ford Global Technologies, LLC, Dearborn, MI (US)

(72) Inventors: Georg Louven, Neuwied (DE); Jens Wojahn, Bergisch Gladbach (DE); Klemens Grieser, Langenfeld (DE); Marco Marceno, Hagen (DE); Helmut Hans Ruhland, Eschweiler (DE); Thomas Lorenz, Cologne (DE); Moritz Klaus Springer, Hagen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 890 days.

(21) Appl. No.: 13/901,452

(22) Filed: May 23, 2013

(65) Prior Publication Data

US 2013/0332052 A1    Dec. 12, 2013

(30) Foreign Application Priority Data

Jun. 12, 2012   (DE) .................. 10 2012 209 785

(51) Int. Cl.
*F02D 41/04*       (2006.01)
*F02D 41/30*       (2006.01)
(Continued)

(52) U.S. Cl.
CPC ......... *F02D 41/3005* (2013.01); *F02D 41/008* (2013.01); *F02D 41/402* (2013.01); *F02D 2250/04* (2013.01); *Y02T 10/44* (2013.01)

(58) Field of Classification Search
CPC .. F02D 41/3005; F02D 41/402; F02D 41/008; F02D 2250/04; Y02T 10/44
(Continued)

(56) References Cited

U.S. PATENT DOCUMENTS

| 4,407,251 A |   | 10/1983 | Nakanishi |
| 5,083,427 A | * | 1/1992 | Anderson ............... F01N 3/28 60/274 |

(Continued)

FOREIGN PATENT DOCUMENTS

| CN | 101855439 A | 10/2010 |
| DE | 102007053403 A1 | 5/2009 |
| FR | 2961265 A1 | 12/2011 |

OTHER PUBLICATIONS

Partial Translation of Office Action of Chinese Application No. 201310232640.0, Issued Aug. 2, 2016, State Intellectual Property Office of PRC, 12 Pages.

*Primary Examiner* — Stephen K Cronin
*Assistant Examiner* — Arnold Castro
(74) *Attorney, Agent, or Firm* — Julie Voutyras; Alleman Hall McCoy Russell & Tuttle LLP

(57) ABSTRACT

The disclosure relates to a method for operating an internal combustion engine having a plurality of cylinders, the method comprising, during one working cycle, distributing fuel for each cylinder of the plurality of cylinders among a plurality of injection processes according to settable split factors which respectively define a setpoint fuel mass and/or injection duration and time setting of each respective injection process for the plurality of individual injection processes, wherein random variation is carried out for at least one injection process.

17 Claims, 8 Drawing Sheets

(51) Int. Cl.
*F02D 41/00* (2006.01)
*F02D 41/40* (2006.01)

(58) Field of Classification Search
USPC .................................................. 701/104, 105
See application file for complete search history.

(56) References Cited

U.S. PATENT DOCUMENTS

| | | | |
|---|---|---|---|
| 7,904,232 B2 | 3/2011 | Kemmer et al. | |
| 8,113,178 B2* | 2/2012 | Park .................... | F02D 41/3863 |
| | | | 123/467 |
| 2009/0210133 A1* | 8/2009 | Kemmer ............... | F02D 41/025 |
| | | | 701/103 |
| 2010/0318275 A1* | 12/2010 | Borchsenius ....... | F02D 41/3809 |
| | | | 701/102 |
| 2012/0143479 A1* | 6/2012 | Nada ................... | F02D 41/3029 |
| | | | 701/104 |
| 2013/0152903 A1* | 6/2013 | Leone .................. | F02D 41/062 |
| | | | 123/491 |
| 2014/0025278 A1* | 1/2014 | Gwidt .................. | F02D 35/028 |
| | | | 701/105 |

* cited by examiner

METHOD AND DEVICE FOR OPERATING AN INTERNAL COMBUSTION ENGINE

CROSS REFERENCE TO RELATED APPLICATIONS

The present application claims priority to German Patent Application No. 102012209785.6, filed on Jun. 12, 2012, the entire contents of which are hereby incorporated by reference for all purposes.

FIELD

The disclosure relates to a method and to a device for operating an internal combustion engine. In particular, the disclosure relates to a method and to a device for operating an internal combustion engine by means of which instability in the running of the engine which occurs during operation of the engine and is due to the generation of pressure waves can be avoided or at least reduced.

BACKGROUND AND SUMMARY

The operation of an internal combustion engine with multiple injections (also referred to as "split injection") is used, inter alia, for reducing particle emissions. In this context, the conventional injection of an individual fuel injection during the working cycle is replaced by the injection of a plurality of chronologically distributed fuel injections, wherein comparatively less fuel is used for each individual injection process than in the case of an individual injection.

However, a problem which occurs in practice in the case of multiple injections is that pressure waves which occur in the fuel line of systems with high fuel pressure during operation in a mode with multiple injections can cause the internal combustion engine to operate in an unstable fashion.

This instability is caused by undesired deviation in the actual injection quantity brought about by pressure pulsations in the common fuel line. Depending on the distribution and chronological arrangement of the multiple injections at all the cylinders, these high pressure pulsations can occur due to unfavorable superimposition of the excitation as a result of the respective extraction of fuel.

The inventors herein have recognized the above issues and provide a method to at least partly address them. In one embodiment, a method for operating an internal combustion engine having a plurality of cylinders comprises, during one working cycle, distributing fuel for each cylinder of the plurality of cylinders among a plurality of injection processes according to settable split factors which respectively define a setpoint fuel mass and/or injection duration and time setting of each respective injection process for the plurality of individual injection processes, wherein random variation is carried out for at least one injection process.

Thus, the method according to the disclosure for operating an internal combustion engine comprising a plurality of cylinders, during one working cycle, the fuel injection for each of the cylinders is distributed among a plurality of injection processes according to settable split factors which respectively define the setpoint fuel mass and/or the injection duration and the time setting of the respective injection process for the individual injection processes, wherein random variation is carried out for at least one injection process.

The present disclosure is based, in particular, on the concept of performing random variation of the split factors for individual injection processes within a range defined by a tolerance value during an operating mode of the internal combustion engine with multiple injections. By means of such a device or by increasing the splitting or apportioning of the fuel injection for the individual injection processes it is possible as a result to reduce the pressure waves within the fuel line. In this context, a reduction in pressure waves within the fuel line can already be achieved by marginal change in the split factors for each injection process and each cylinder.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Engines may be configured to operate under a split injection mode, wherein more than fuel injection is performed to a given cylinder during a cylinder cycle. Depending on the frequency of the injections, pressure waves may build in the fuel system, leading to degradation of the system components. To disrupt and/or prevent such waves, various parameters of the fuel injections may be randomly adjusted. For example, the fuel mass of a first injection event of a plurality of injection events of a cylinder may be randomly adjusted away from the setpoint fuel mass determined based on operating conditions. The adjusted fuel mass may be compensated by adjusting a later fuel injection event (performed to the same cylinder during the same cylinder cycle).

According to the disclosure, the random variation can occur in the time setting for at least one injection process. According to a further embodiment, the random variation is carried out by means of the time setting of at least one injection at one cylinder in such a way that the excitation of the pressure pulsations is detuned.

According to one embodiment, the random variation of the setpoint fuel mass and/or of the injection duration therefore takes place for at least two injection processes in such a way that pressure waves which occur are reduced in comparison with an analogous operation without the random variation.

According to a further embodiment, the random variation takes place both in the time setting for at least one injection process and in the setpoint fuel mass and/or injection duration for at least two injection processes.

According to a further embodiment, the random variation of the setpoint fuel mass takes place for at least two injection processes in a predefined tolerance range. According to a further embodiment, the random variation of the setpoint fuel mass takes place for at least two injection processes in such a way that pressure waves which occur are reduced in comparison with an analogous operation without the random variation.

According to one embodiment, the random variation of the setpoint fuel mass takes place for each of the cylinders in such a way that the sum of the setpoint fuel masses which are to be injected in all the injection processes remains unchanged for the respective cylinder.

According to one embodiment, the method also has a fault diagnosis step in which a fault message is generated as a function of the value of the sum of the split factors. This can take place, in particular, when the sum of the split ratios for a respective combustion cycle is greater than one (and/or is greater than 100%).

The disclosure also relates to a device for operating an internal combustion engine comprising a plurality of cylinders and which is configured to carry out a method having the features described above.

Figure 1:
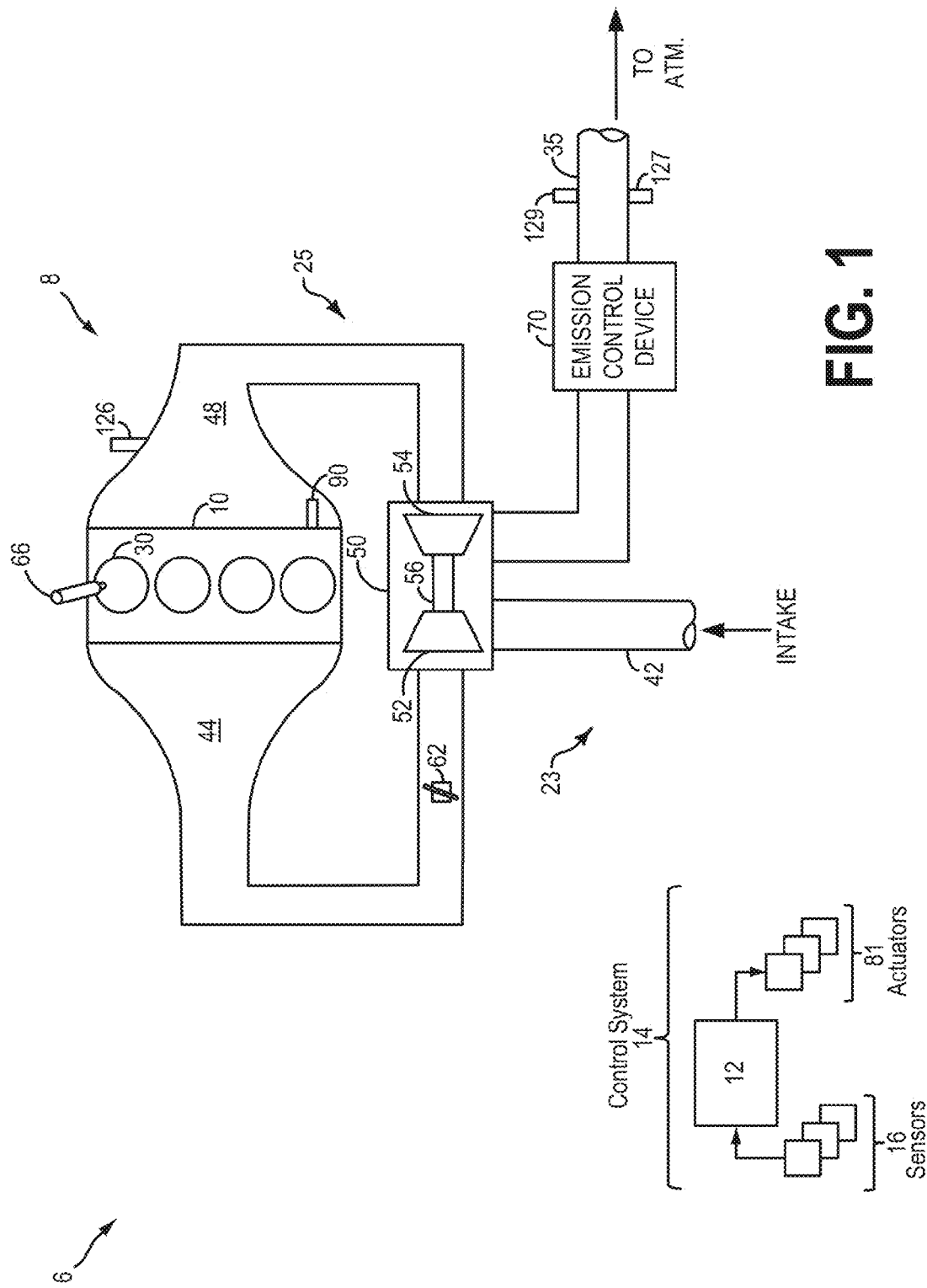
FIG. 1 shows a schematic depiction of a vehicle system including an engine.

FIG. 1 shows a schematic depiction of a vehicle system 6 including an engine system 8. The engine system 8 may include an engine 10 having a plurality of cylinders 30. Engine 10 includes an engine intake 23 and an engine exhaust 25. Engine intake 23 includes a throttle 62 fluidly coupled to the engine intake manifold 44 via an intake passage 42. The engine exhaust 25 includes an exhaust manifold 48 eventually leading to an exhaust passage 35 that routes exhaust gas to the atmosphere. Throttle 62 may be located in intake passage 42 downstream of a boosting device, such as turbocharger 50, or a supercharger, and upstream of an after-cooler (not shown). As such, the after-cooler may be configured to reduce the temperature of the intake air compressed by the boosting device. Turbocharger 50 may include a compressor 52, arranged between intake passage 42 and intake manifold 44. Compressor 52 may be at least partially powered by exhaust turbine 54, arranged between exhaust manifold 48 and exhaust passage 35, via turbine shaft 56.

Engine exhaust 25 may include one or more emission control devices 70, which may be mounted in a close-coupled position in the exhaust. One or more emission control devices may include a three-way catalyst, lean NOx filter, SCR catalyst, PM filter, etc.

Engine system 8 may further include one (as depicted) or more knock sensors 90 distributed along engine block 11. When included, the plurality of knock sensors may be distributed symmetrically or asymmetrically along the engine block. Knock sensor 90 may be an accelerometer, or an ionization sensor.

The vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 (located in exhaust manifold 48), knock sensor(s) 90, temperature sensor 127, and pressure sensor 129 (located downstream of emission control device 70). Other sensors such as pressure, temperature, air/fuel ratio, and composition sensors may be coupled to various locations in the vehicle system 6, as discussed in more detail herein. As another example, the actuators may include fuel injectors 66, and throttle 62. The control system 14 may include a controller 12. The controller may receive input data from the various sensors, process the input data, and trigger the actuators in response to the processed input data based on instruction or code programmed therein corresponding to one or more routines. Example control routines are described herein with reference to FIGS. 6-8.

Figure 2:
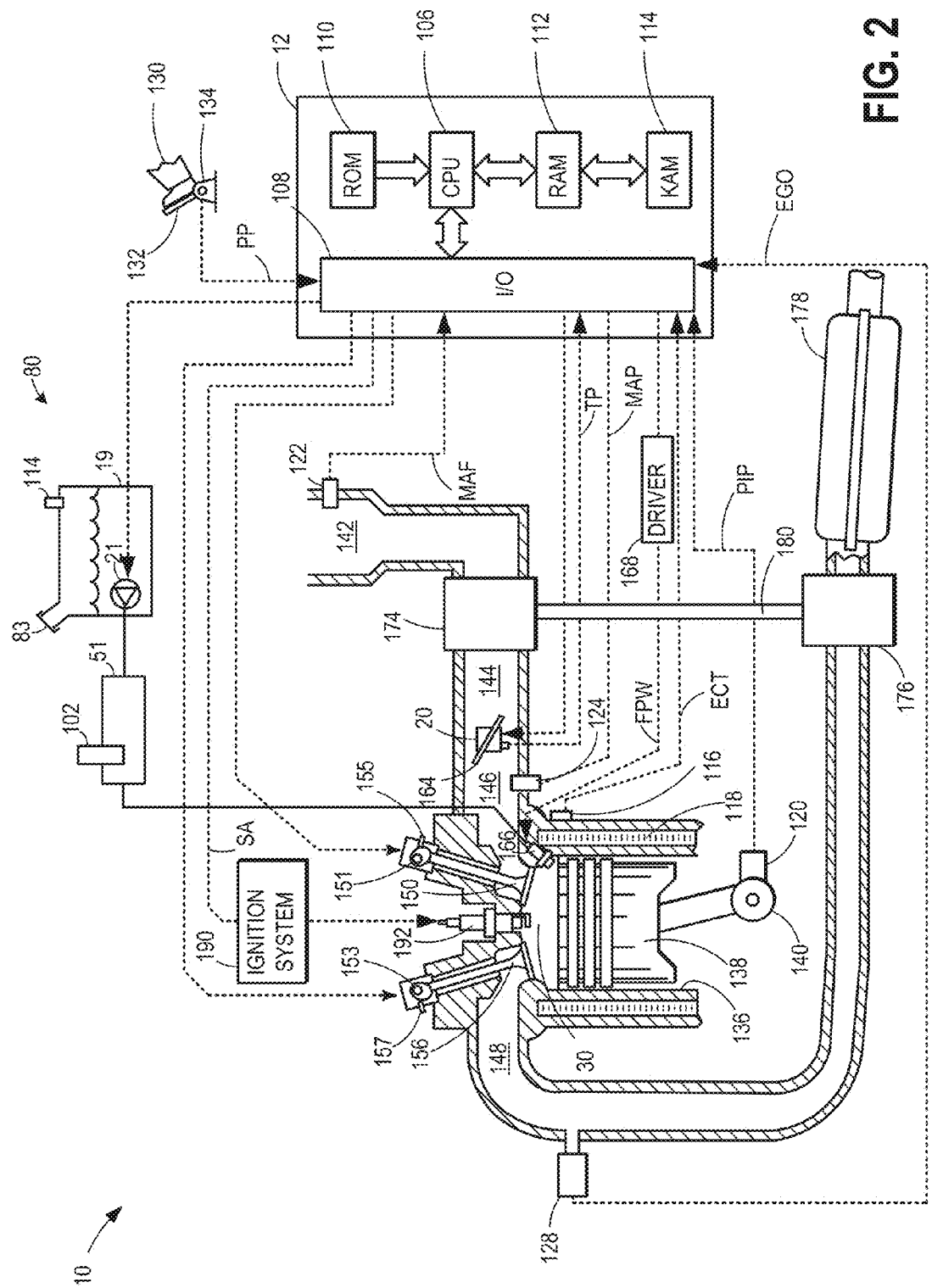
FIG. 2 depicts an example embodiment of a combustion chamber or cylinder of the engine of FIG. 1.

FIG. 2 depicts an example embodiment of a combustion chamber or cylinder of internal combustion engine 10 (of FIG. 1). Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 30 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 30 can receive intake air via a series of intake air passages 142, 144, and 146. Intake air passage 146 can communicate with other cylinders of engine 10 in addition to cylinder 30. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 2, or alternatively may be provided upstream of compressor 174.

Exhaust passage 148 can receive exhaust gases from other cylinders of engine 10 in addition to cylinder 30. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 30 is shown including at least one intake poppet valve 150 and at least one exhaust poppet valve 156 located at an upper region of cylinder 30. In some embodiments, each cylinder of engine 10, including cylinder 30, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 30 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 30 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 30 is shown including one fuel injector 166. Fuel injector 166 is shown coupled directly to cylinder 30 for injecting fuel directly therein in proportion to the pulse width of signal FPW received from controller 12 via electronic driver 168. In this manner, fuel injector 166 provides what is known as direct injection (hereafter also referred to as "DI") of fuel into combustion cylinder 30. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing.

Fuel may be delivered to fuel injector 166 from a high pressure fuel system 80 including fuel tanks, fuel pumps, and a fuel rail. For example, fuel tank 19 may store liquid fuel such as gasoline, fuel with a range of alcohol concentrations, various gasoline-ethanol fuel blends (e.g., E10, E85), and combinations thereof. As shown, fuel tank 19 may be coupled to a fuel pump 21 for pressurizing fuel delivered to fuel rail 51. A fuel rail pressure sensor 102 in fuel rail 51 may be configured to sense the current fuel rail pressure and provide the sensed value to controller 12 of control system 14. In some examples, pump 21 may be controlled based on the fuel rail pressure sensed by sensor 102, and/or based on other parameter values. Fuel tank 19 may be refilled with liquid fuel via fueling port 83. Fuel may be delivered from fuel tank 19 to the injectors of engine 10, such as example injector 166, via fuel rail 51. While only a single injector coupled with the fuel rail is depicted, it will be appreciated that additional injectors are provided for each cylinder.

Alternatively, fuel may be delivered by a single stage fuel pump at lower pressure, in which case the timing of the direct fuel injection may be more limited during the compression stroke than if a high pressure fuel system is used. Further, while not shown, the fuel tank may have a pressure transducer providing a signal to controller 12. It will be appreciated that, in an alternate embodiment, injector 166 may be a port injector providing fuel into the intake port upstream of cylinder 30.

As described above, FIG. 2 shows only one cylinder of a multi-cylinder engine. As such each cylinder may similarly include its own set of intake/exhaust valves, fuel injector(s), spark plug, etc.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; absolute manifold pressure signal (MAP) from sensor 124, cylinder AFR from EGO sensor 128, and abnormal combustion from a knock sensor and a crankshaft acceleration sensor. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed.

Figure 3:
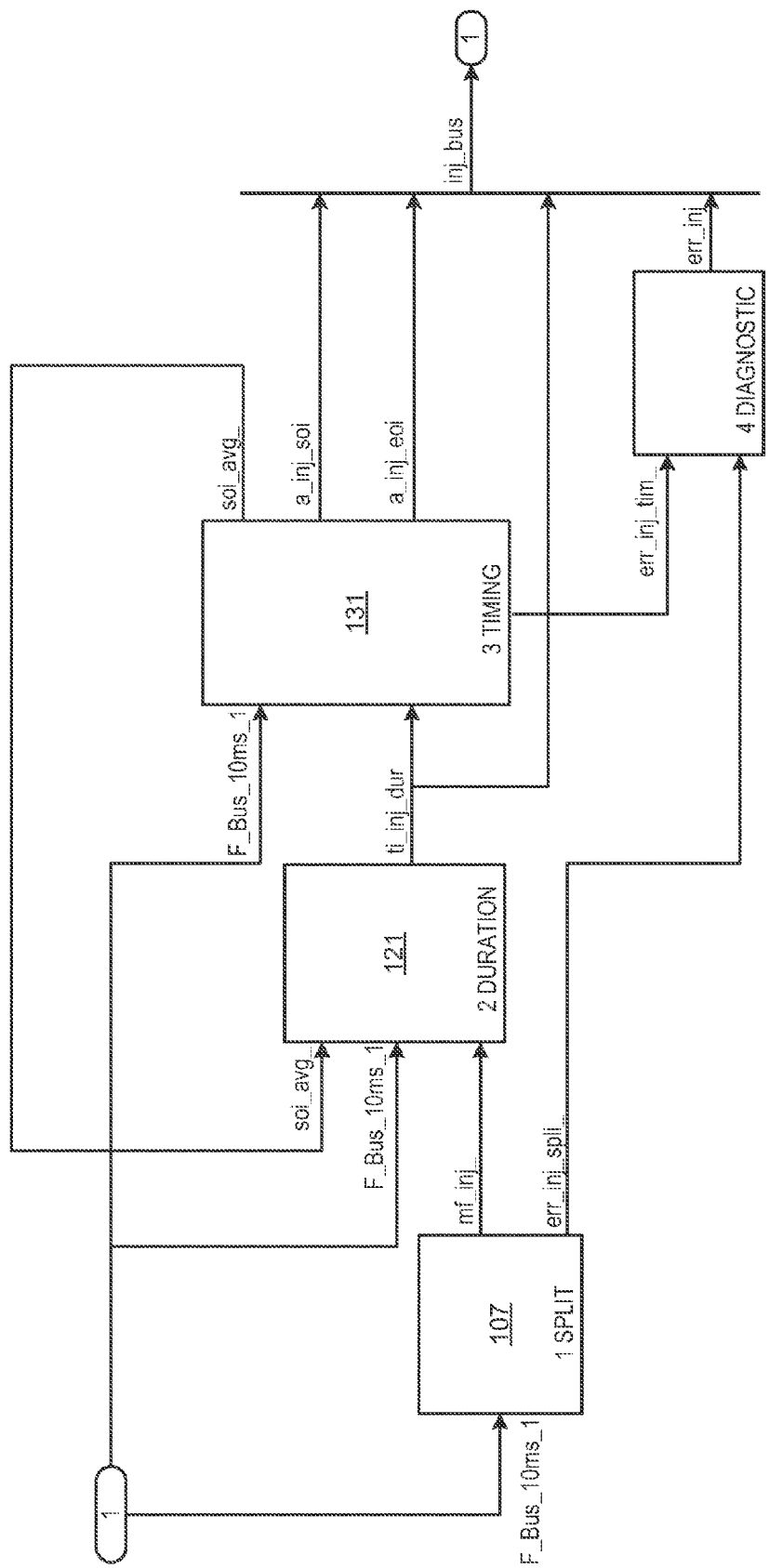
FIG. 3 shows a block diagram which shows an overview of the components used in a method according to the disclosure.

FIG. 3 first shows an overview of the components used in a method according to the disclosure for operating an internal combustion engine in the multiple injection mode. In one example, the components depicted in FIG. 3 may be included as part of controller 12 described above.

According to the block diagram in FIG. 3, a split unit 107 serves to calculate the fuel mass to be injected from the required fuel mass for each injection process, which fuel mass to be injected is defined by a torque model. The calculated fuel mass is identical for the respective injection processes for all the cylinders. In this context, it is possible to set different split ratios for each state of the internal combustion engine.

An injection duration unit 121 serves to calculate the injection duration for each injection process. This calculation includes pressure differences over the respective injection process, which includes calculation of the internal pressure of the cylinder as a function of the valve timing and the dynamic fuel flow for each injection nozzle.

A time setting unit 131 serves to set the time of the individual injection processes, wherein this time setting for each injection process is defined by the start of injection (SOI) and the end of injection (EOI). Within the time setting unit 131 the start of injection (SOI) can be set manually for each engine state. Depending on the state of the internal combustion engine, the injection system can permit up to, for example, five injection processes per cylinder and engine cycle. In this context, the start of injection is typically set for the first, the second, the third and the fourth injection process, whereas for the fifth injection process the end of injection (EOI) is set. In the case of stratified combustion or stratified loading operation, the fifth injection process can also be coupled with the injection setting.

Figure 4:
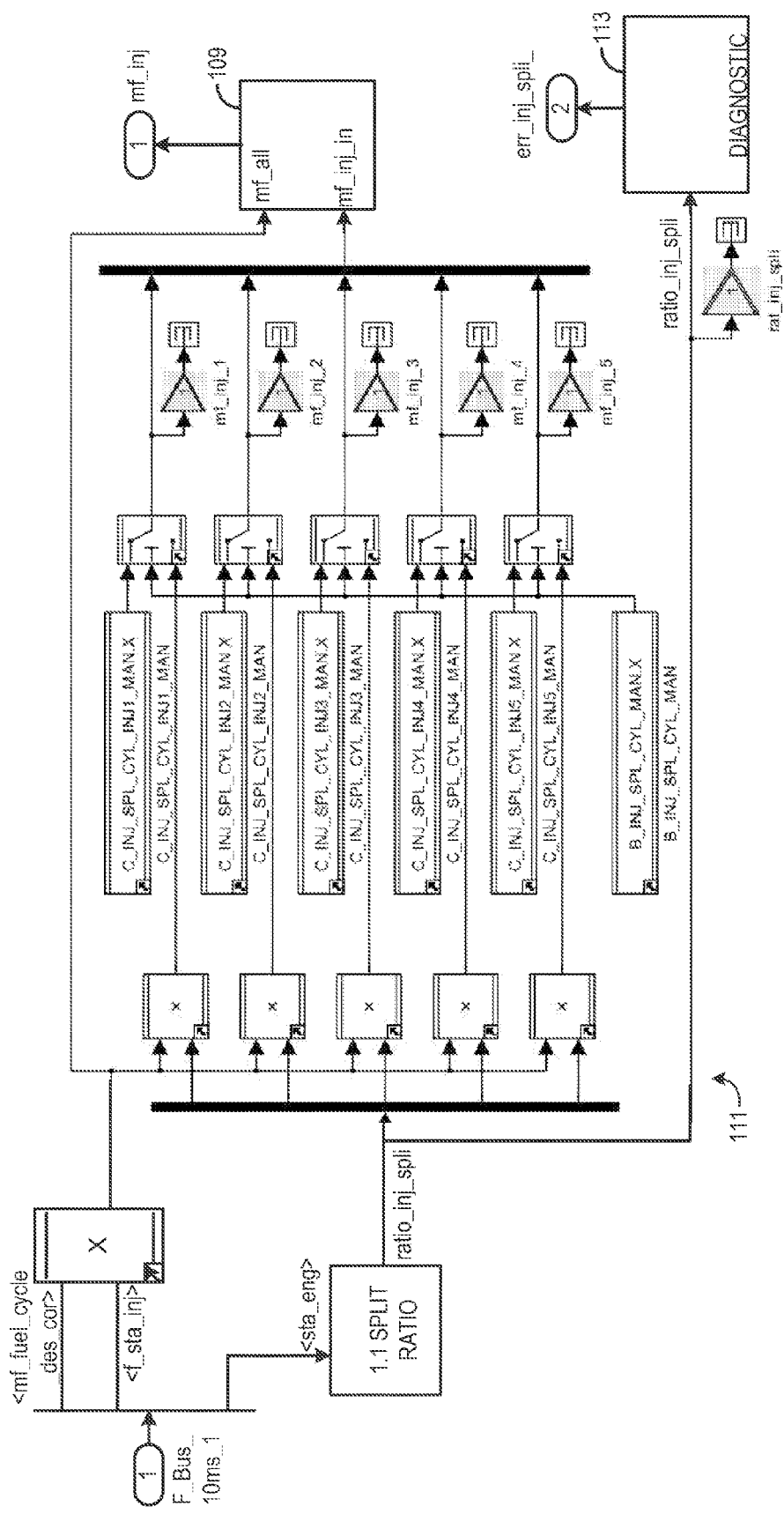
FIG. 4 shows a block diagram explaining in more detail a split unit which is present in the arrangement in FIG. 3.

According to FIG. 4, the split unit 107 in the exemplary embodiment is divided into three functional blocks 111, 109 and 113. A first functional block 111 permits a ratio to be set which defines the splitting for each engine cycle and for all the cylinders. The ratio can be predefined for each engine state or set manually. Furthermore, according to FIG. 4 simple multiplication of the individual split ratios by the fuel mass calculated on the basis of the torque model takes place.

For each of the five injection processes, according to FIG. 4 a split ratio (or a split factor) can be set in the function block 111, which split ratio (or split factor) defines the setpoint fuel mass (mf_inj), the injection duration (ti_dinj_dur) and the time setting (a_inj_soi/a_inj_eoi) determined by the start of injection and the end of injection. In this context, it is possible to set dynamically for each injection nozzle, in a different way, the Q parameter which is predefined conventionally by the supplier for the injection nozzle.

According to FIG. 4, the setpoint fuel masses (mf_inj_1 to mf_inj_5) are fed to a second function block 109. This second function block 109 according to FIG. 4 serves, as is explained below, to reduce the generation of pressure waves during operation of the internal combustion engine with multiple injections.

A detailed diagram for explaining this second function block 109 is illustrated in FIG. 54. If the function block 109 is activated, in the exemplary embodiment random variation of the fuel mass takes place for the first injection process and for the second injection process, whereas the third injection process remains unchanged. This variation takes place in a random block which is provided for this purpose, in a region which is defined by a predefined tolerance value. By means of such a reduction or increase in the splitting or apportioning of the fuel injection for the individual injection processes it is possible as a result to reduce the pressure waves within the fuel line.

In this context, in order to maintain the engine load, it is necessary for the resulting sum of the setpoint fuel masses to be injected to remain unchanged. If, for example, in the above example the fuel mass which is used for the first injection process is reduced by three percent (%), the fuel mass which is used for the second injection process must be increased by a factor which results in the same setpoint fuel mass.

Figure 5:
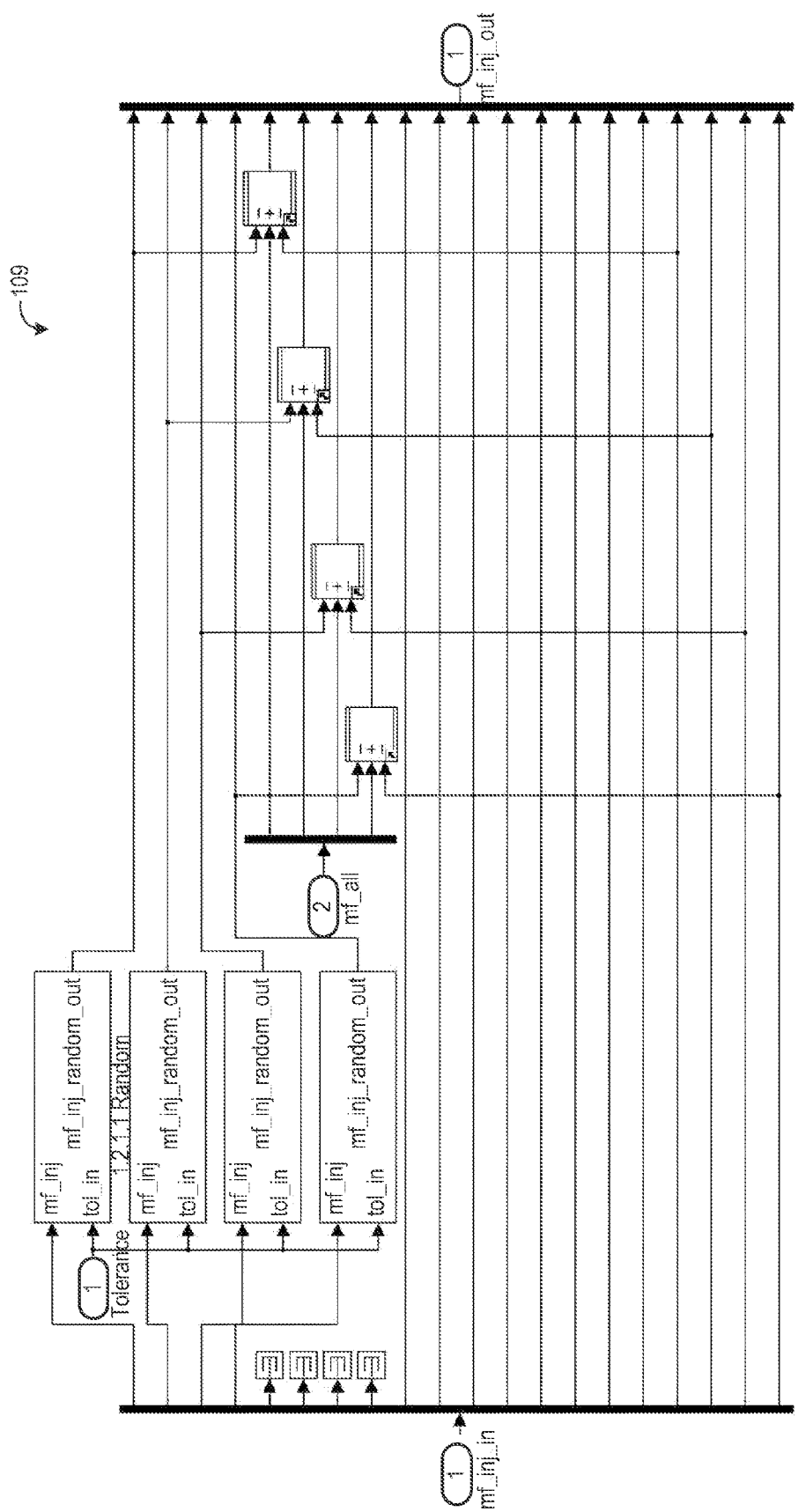
FIG. 5 shows a block diagram explaining in more detail a further functional block which is present in the split unit in FIG. 4.

Furthermore, according to FIG. 5, the five injection ratios for an injection process are combined in one vector "rat_inj_spli". As is also apparent from FIG. 5, in a third function block 113 it is checked whether the sum of the split ratios for a respective injection cycle is greater than one (corresponding to a value above 100%), in which case a fault message is generated.

Figure 6:
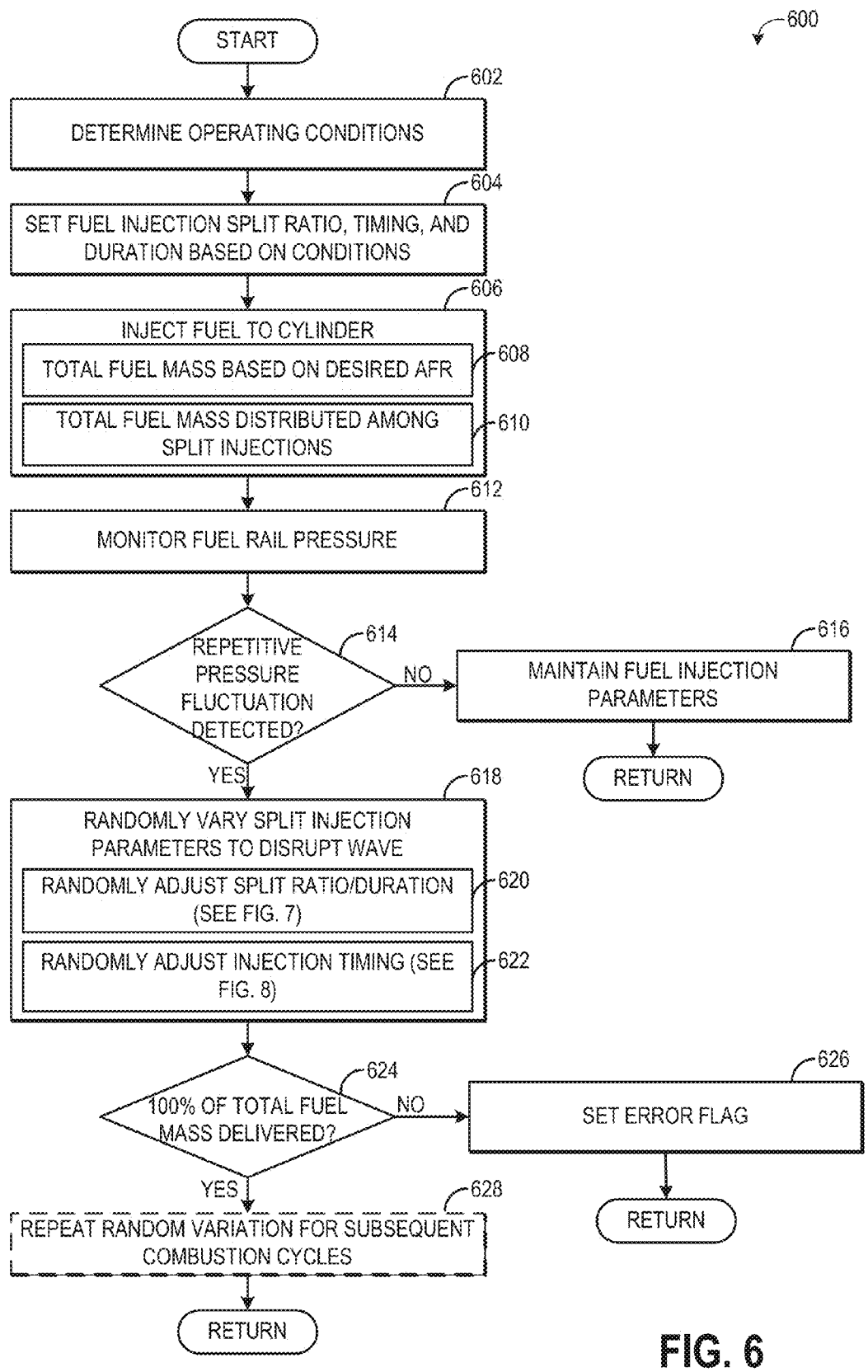
FIGS. 6-8 are flow charts illustrating methods for randomly varying split injection parameters according to embodiments of the disclosure.

Turning now to FIG. 6, a method 600 for injecting fuel to an engine is depicted. Method 600 may be carried out by an engine controller, such as controller 12 of FIGS. 1 and 2, according to instructions stored thereon. Method 600 sets the parameters of fuel injection for each combustion event of each cylinder of an engine based on operating conditions, and then if indicated, randomly varies at least one of the injection parameters to prevent or disrupt pressure pulsations within the fuel rail or other fuel system components.

At 602, engine operating parameters are determined. The operating parameters may be determined from signals received from various engine sensors. For example, engine speed, engine load, engine temperature, duration since an engine start, fuel rail pressure, exhaust aftertreatment regeneration state, and other parameters may be measured, estimated, or inferred.

At 604, fuel injection parameters are set based on the previously determined operating conditions. The fuel injection parameters include a split ratio, which includes the number of injections performed at each cylinder per combustion cycle and the fuel mass of each split injection, injection timing (start and/or end of injection), and injection duration. The injection parameters may be optimized for different operating parameters. For example, during an engine start sequence, fewer injection events may be performed than during engine running conditions. Further, a purge or regeneration of an exhaust aftertreatment device (such as a lean NOx trap or particulate filter) may rely on increased exhaust temperature; the fuel injection parameters may be adjusted during the purge to increase the exhaust temperature.

At 606, method 600 includes split injecting fuel to a cylinder. Injecting fuel to a cylinder includes, at 608, injecting a total fuel mass based on desired air-fuel ratio (AFR). That is, the total amount of fuel injected to one cylinder during one cylinder cycle may be selected to maintain air-fuel ratio at a desired ratio (such as stoichiometry) and deliver a requested amount of torque. Further, as indicated at 610, this total fuel mass is distributed among the split injections according to the split ratio set at 604.

Upon commencement of fuel injection, fuel injection pressure is monitored at 612. The monitoring of fuel injection pressure may include monitoring fuel rail pressure, the pressure in one or more lines delivering fuel from the rail to the injectors, the pressure of the injectors themselves, and/or other suitable pressures. At 614, method 600 determines if a repetitive pressure fluctuation is detected. The repetitive pressure fluctuation may include a pressure wave propagated in the fuel rail, fuel delivery lines, or other fuel system components. The repetitive pressure fluctuation may be detected based on the monitored fuel injection pressure. In one example, pressure waves with amplitudes below a threshold may not be detected as a repetitive pressure fluctuation. The threshold amplitude of the pressure wave may be an amplitude above which degradation to an engine component may occur, and/or it may be an amplitude above which vibrations may be noticeable to a vehicle operator.

The pressure fluctuation may be repetitive, that is occurring at least more than one time in a give time period.

If a repetitive pressure fluctuation is not detected, method 600 proceeds to 616 to maintain the fuel injection parameters determined at 604, and method 600 returns. If a repetitive pressure fluctuation is detected, method 600 proceeds to 618 to randomly vary one or more split injection parameters to disrupt the pressure fluctuation. This may include randomly adjusting the split ratio and/or duration, as indicated at 620 and explained in more detail below with regards to FIG. 7. Further, randomly varying one or more split injection parameters may include randomly adjusting injection timing, as indicated at 622 and explained in more detail below with regards to FIG. 8. The random adjustment to the fuel injection parameter or parameters may be performed on the current combustion cycle, or it may be performed on a subsequent combustion cycle. Further, this random adjustment may be applied to the fuel injection of a single cylinder of a multi-cylinder engine, while maintaining the initial injection parameters of the remaining cylinders, or it may be applied to the fuel injection events of more than one cylinder of the engine.

The random adjustment to the fuel injection parameters may alter the mass of fuel delivered during two or more split injections. To ensure that the total mass of fuel is delivered to the cylinder, the fuel mass of each split injection may be summed and compared to the target total fuel mass, set based on desired air-fuel ratio. At 624, it is determined if 100% of the total fuel mass is delivered. If no, that is, if more or less fuel than desired is actually delivered, method 600 proceeds to 624 to set an error flag, and take default action. For example, the random adjustment may be ceased, additional fuel may be injected in a subsequent combustion event, etc.

If 100% of the total fuel mass is delivered, method 600 optionally proceeds to 626 to repeat the random variation for subsequent combustion cycles, and then method 600 returns.

Figure 7:
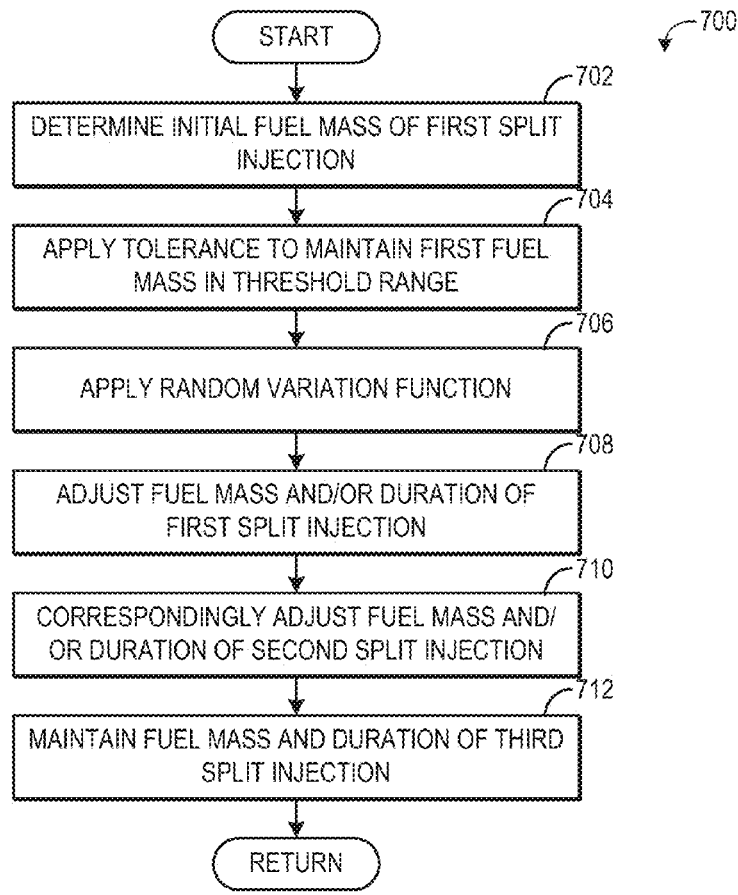

Turning now to FIG. 7, a method 700 for randomly varying a split ratio of a cylinder fuel injection event is illustrated. Method 700 may be performed by a controller, during the execution of method 600 explained above, responsive to an indication to randomly vary the mass and/or duration of a given split fuel injection. Method 700 includes, at 702, determining an initial fuel mass of a first split injection. The initial fuel mass may be determined based on a total fuel mass to be delivered to the cylinder and a fraction of that fuel mass that is to be delivered by the first injection, otherwise referred to as the split ratio. For example, if three fuel injections of equal mass are to be performed on a single cylinder during a given combustion cycle, the initial fuel mass of the first split injection may be ⅓ of the total fuel mass.

At 704, a tolerance function is applied to maintain the first fuel mass in a threshold range. For example, the tolerance function may limit the random variation, described below, to adjusting the first fuel mass by less than a threshold amount, such as 10%. Because the fuel injection parameters are set based on operating conditions (to deliver the fuel in amounts and timings optimized for maximizing power, minimizing particulates, or other desired outcomes), major adjustments to the amount of fuel delivered by a split injection could result in diminished torque, excess particulates, or other undesired conditions. Thus, the tolerance function may maintain the variation to the injection parameters within a range that allows disruption of the pressure waves without perturbations to fuel efficiency, emissions, or other parameters.

The range of variation imposed by the tolerance function may be a suitable range. For example, it may be a fixed range, such as a variation of less than 10%. In other examples, the tolerance may depend on the initial fuel injection parameters. As an example, if the initial fuel mass that the first split injection is intended to deliver is relatively small, the tolerance may only allow a 2% decrease in the fuel mass, to prevent metering errors that may occur when delivering small amounts of fuel, while allowing a larger increase in the fuel mass, such as 5%.

At 706, a random variation function is applied to the initial fuel mass of the first split injection. The random variation function may be a random number generator, bounded by the tolerance described above, such as a true random number generator or a pseudo-random number generator. In one example, the fuel mass and/or duration of fuel injection may be adjusted by a percentile amount specified by the random variation function. Further, in some embodiments, other filters or functions may be applied to generate the variation applied to the fuel mass, such as a Gaussian function. Further still, additional functions may be applied to the random number generated by the random number generator, to ensure the number is different from the last random number generated, for example.

At 708, the fuel mass and/or duration of the first split injection may be adjusted based on the random variation applied at 706. For example, the fuel mass of the first split injection may be increased by 5%. To deliver the adjusted fuel mass, the injection duration may also be adjusted. For example, at a steady fuel injection pressure, in order to increase the fuel mass of the first split injection by 5%, the duration that the fuel injector is open may be increased to deliver the extra fuel. At 710, the fuel mass and/or injection duration of the second split injection may be adjusted by a corresponding amount. To maintain a desired or commanded total fuel injection mass for the whole cylinder cycle, the second split injection may be adjusted to compensate for the change to the first split injection. For example, if the fuel mass of the first injection is increased by 5%, the fuel mass of the second split injection may be decreased by 5%. In this way, the random adjustment to the first injection may be compensated by an adjustment to the second injection in order to deliver the same amount of fuel to the cylinder as would be delivered without the random variation. The compensation is typically performed on one other split injection of the cylinder cycle, and thus if a third split injection is performed, its mass and duration are maintained and not adjusted, as indicated at 712.

Figure 8:
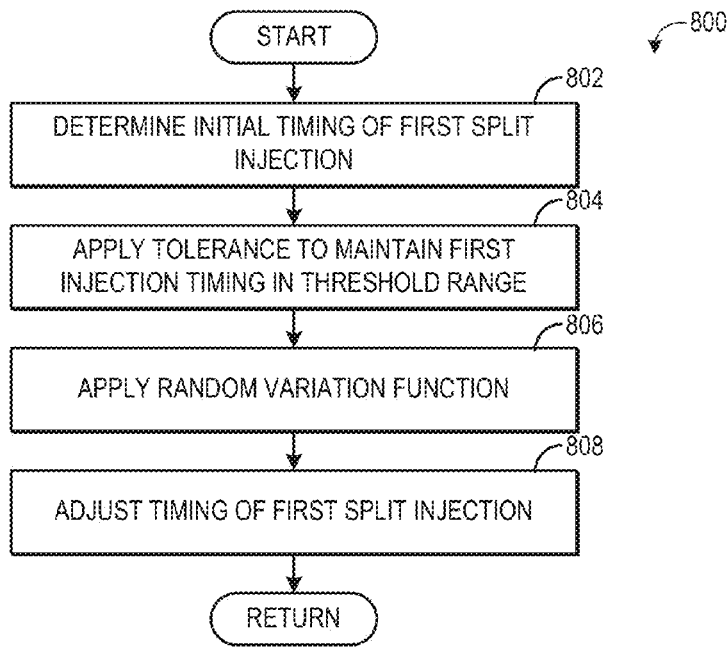

FIG. 8 illustrates a method 800 for randomly adjusting injection timing of a split injection. Similar to method 700, method 800 may be performed by a controller, during the execution of method 600 explained above, responsive to an indication to randomly vary the injection timing of a given split fuel injection.

At 802, method 800 includes determining an initial timing of a first split fuel injection. The timing of the injection may include a start of injection, or an end of injection. The injection timing of the split injection may be determined based on operating parameters, as explained above. At 804, a tolerance is applied to maintain the injection timing within a threshold range, similar to the tolerance applied at 704 above. At 806, a random variation function is applied to randomly vary the timing of the split injection. The random variation may similar to the random variation performed at 706 of method 700. At 808, the timing of the first split injection is adjusted based on the random variation determined at 806.

While the methods described above randomly adjust fuel mass or injection timing of a split injection, in some embodiments both fuel mass and injection timing may be adjusted. Further, in some embodiments the fuel mass of a first split injection may be adjusted, and the fuel mass and injection timing of a second split injection may also be adjusted. Further, the above-described methods randomly vary the fuel injection parameters responsive to an indication that a pressure wave is propagating the fuel system. However, in some embodiments, the random variation may be carried out proactively before a pressure wave has built, in order to prevent the build-up of the pressure wave. In such embodiments, the random variation may be performed automatically at each cylinder cycle or performed automatically on selected cylinder cycles.

Thus, the methods described provide for a method, comprising split injecting fuel in two or more injections into a cylinder during a single combustion cycle; and randomly varying at least one of the two or more injections. The randomly varying may include randomly varying one or more of a fuel injection mass, injection timing, and injection duration. In one example, the randomly varying includes randomly varying a fuel injection mass of a first injection of the two or more injections, and the method may further comprise adjusting a fuel injection mass of a second injection of the two or more injections based on, and to compensate for, the random variation of the first injection, where a desired total amount of injected fuel is maintained for the two or more injections even with the random variation. In another example, the randomly varying includes randomly varying an injection timing of one of the two or more injections.

In an embodiment, a method comprises split injecting fuel including at least a first fuel mass and a second fuel mass to a cylinder during a first cylinder cycle; and randomly varying a split ratio of the first fuel mass relative to the second fuel mass for each of a plurality of subsequent cylinder cycles. The method includes randomly adjusting the first fuel mass and adjusting the second fuel mass to compensate for the adjustment to the first fuel mass. Adjusting the first fuel mass comprises adjusting the first fuel mass by less than a threshold amount from an initial setpoint fuel mass. The initial setpoint fuel mass may be set based on engine operating conditions. In embodiments, the method may further comprise injecting a third fuel mass during the first cylinder cycle, wherein the third fuel mass is maintained over each subsequent engine cycle. A total mass of fuel injected to the cylinder may remain constant over each subsequent cylinder cycle.

As used in the disclosure, cylinder cycle or combustion cycle may refer to, in a four stroke engine, a complete cycle of intake, compression, expansion, and exhaust strokes of a given cylinder. Each cylinder may undergo a combustion or cylinder cycle in a complete engine cycle. Additionally, while the methods described above randomly adjust fuel mass, duration, and/or timing of a first injection, it is to be understood the random adjustment to an injection parameter may be applied to a suitable injection of the two or more injections performed in a cylinder cycle. For example, if a split injection includes five injection events, the first, second, third, fourth, or fifth injection may be randomly varied. Further, if an injection event is randomly varied such that its fuel mass is changed, a later fuel injection may be adjusted to compensate for the random variation. Thus, if a first injection is randomly varied, a second, third, fourth, or fifth injection may be adjusted to compensate for the variation. In some embodiments, to compensate for the variation of a first injection, both a second and a third injection may be adjusted. Other injection adjustments are possible, as discussed in more detail below.

Figure 9:
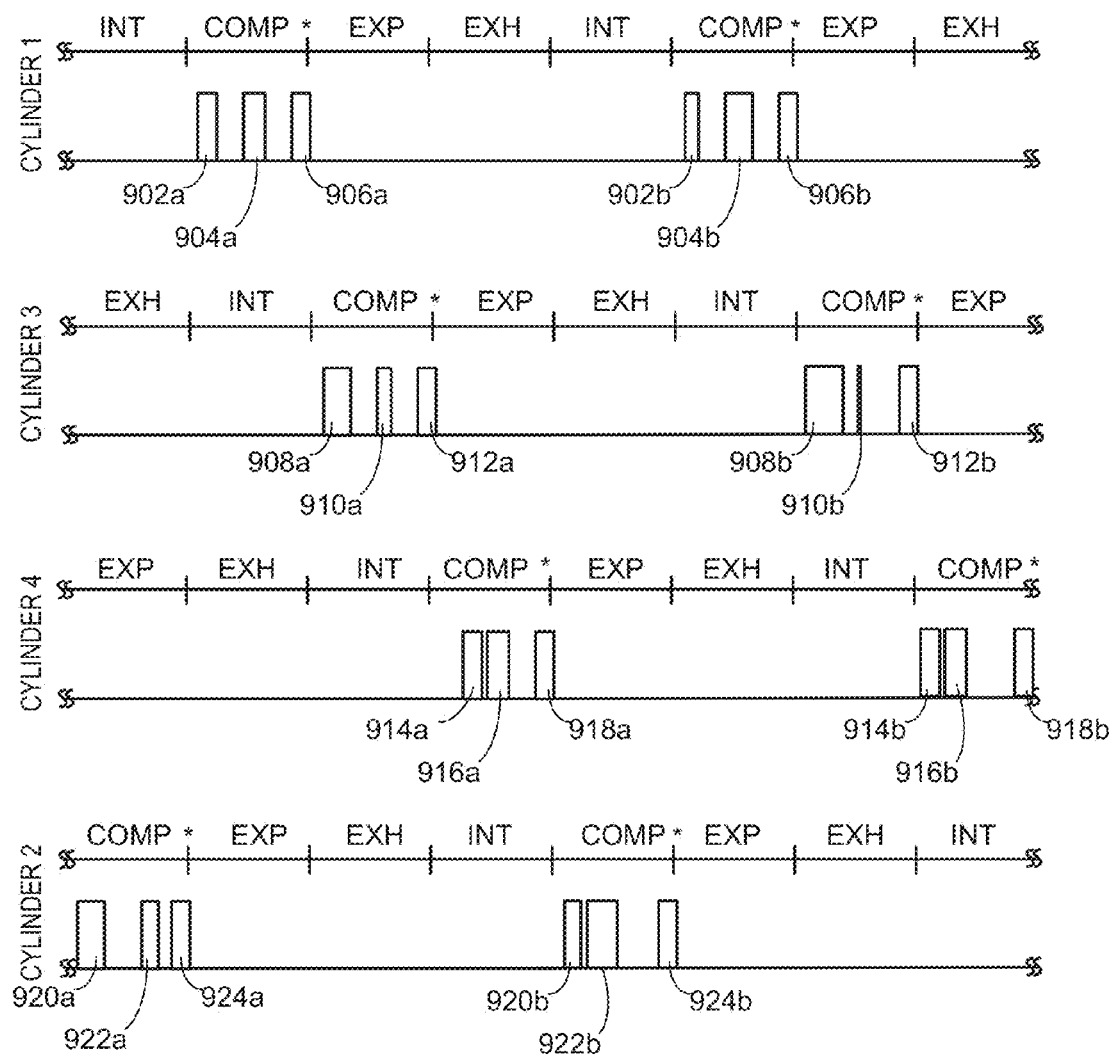
FIG. 9 is a diagram illustrating an example sequence of fuel injection events for a plurality of cylinders.

Referring now to FIG. 9, an example split fuel injection sequence is shown. The sequence of FIG. 9 may be provided by the system of FIGS. 1 and 2 executing the method of FIG. 6. Cylinder timing for an engine including cylinders 1, 2, 3, and 4 is shown. Note that actual fuel injection times may differ from the timings shown in FIG. 9 since FIG. 9 is intended to illustrate the method described herein rather than show particular fuel injection timings.

The first, third, fifth, and seventh plots from the top of FIG. 9 represent cylinder strokes for cylinders number one, three, four, and two of a four cylinder engine. Intake strokes are abbreviated INT while compression strokes are abbreviated as COMP. Expansion strokes are abbreviated as EXP while exhaust strokes are abbreviated as EXH.

The second, fourth, sixth, and eighth plots from the top of FIG. 9 represent fuel injection events for cylinders number one, three, four, and two of the engine. As illustrated in FIG. 9, three injection events (or split injections) occur for each cylinder during each combustion cycle. The first split injection, second split injection, and third split injection for a first cylinder cycle of cylinder number one are indicated as 902*a*, 904*a*, and 906*a*, respectively. The first split injection, second split injection, and third split injection for a first cylinder cycle of cylinder number three are indicated as 908*a*, 910*a*, and 912*a*, respectively. The first split injection, second split injection, and third split injection for a first cylinder cycle of cylinder number four are indicated as 914*a*, 916*a*, and 918*a*, respectively. The first split injection, second split injection, and third split injection for a first cylinder cycle of cylinder number two are indicated as 920*a*, 922*a*, and 924*a*, respectively.

Likewise, the first split injection, second split injection, and third split injection for a second cylinder cycle of cylinder number one are indicated as 902*b*, 904*b*, and 906*b*, respectively. The first split injection, second split injection, and third split injection for a first cylinder cycle of cylinder number three are indicated as 908*b*, 910*b*, and 912*b*, respectively. The first split injection, second split injection, and third split injection for a first cylinder cycle of cylinder number four are indicated as 914*b*, 916*b*, and 918*b*, respectively. The first split injection, second split injection, and third split injection for a first cylinder cycle of cylinder number two are indicated as 920*b*, 922*b*, and 924*b*, respectively.

The number of split injections, as well as the injection timing, fuel mass, and duration for each split injection may be determined based on operating conditions, as explained above. In the illustrated example, the engine may be operating at idle with stratified combustion, and as such, for each combustion event at a given cylinder, three split injections are performed, with the third split injection timing corresponding with ignition timing.

During the injections for the first cylinder cycle of cylinder one, each injection event 902*a*, 904*a*, and 906*a* delivers an equal fuel mass. However, at the second cylinder cycle, a random variation has been applied to the fuel mass of the first injection 902*b*, resulting in a decrease of the fuel mass. The second injection 904*b* is increased by a corresponding amount. The third injection 906*b* delivers the same mass of fuel as the third injection 906*a* of the first cylinder cycle.

For cylinder three, the random variation has been applied to the first injection 908*a* of the first cylinder cycle, increasing the fuel mass. The second injection 910*a* is decreased by a corresponding amount, and the third injection 912*a* does not change from the initial setpoint fuel mass. For the second cylinder cycle, the first injection 908*b* is increased due to the random variation and the second injection 910*b* is decreased.

For cylinder four, the fuel mass of the first injection 914*a*, second injection 916*a*, and third injection 918*a* of the first cylinder cycle are equal to the initial setpoint fuel mass. However, the injection timing of the first injection 914*a* has been retarded. For the second cylinder cycle, the timing of the second injection 916*b* has been advanced.

For cylinder two, the fuel mass of the first injection 920*a* of the first cylinder cycle has been increased and the fuel mass of the second injection 922*a* has been decreased. Also, the injection timing of the second injection 922*a* has been retarded. For the second cylinder cycle, the fuel mass of the first injection 920*b* has been decreased, the fuel mass of the second injection 922*b* has been increased, and the injection timing of the second injection 922*b* has been advanced.

Thus, the sequence illustrated in FIG. 9 includes random variation to fuel mass alone in some examples, random variation to injection timing alone in other examples, and random variation to both fuel mass and injection timing in other examples. Whether random adjustment to the injection parameters is performed only on one parameter or multiple parameters may depend on the amplitude of the pressure wave, tolerance of the random variation of each injection parameter (for example, if the tolerance for adjusting the fuel mass is very narrow, the injection timing may also be adjusted), and other parameters.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating an internal combustion engine having a plurality of cylinders, the method comprising, during one working cycle, distributing fuel for each cylinder of the plurality of cylinders among a plurality of injection processes according to settable split factors which respectively define a setpoint fuel mass and/or injection duration and time setting of each respective injection process for the plurality of individual injection processes,
   wherein random variation is carried out for at least one injection process, the random variation occurring in the time setting for at least one injection process, and the random variation carried out by the time setting of at least one injection at one cylinder to detune excitation of pressure pulsations.

2. The method as claimed in claim 1, wherein the random variation takes place in the setpoint fuel mass and/or in the injection duration for at least two injection processes.

3. The method as claimed in claim 1, wherein the random variation takes place both in the time setting for at least one injection process and in the setpoint fuel mass and/or injection duration for at least two injection processes.

4. The method as claimed in claim 3, wherein the random variation of the setpoint fuel mass takes place for at least two injection processes in a predefined tolerance range.

5. The method as claimed in claim 1, wherein the random variation of the setpoint fuel mass takes place for at least two injection processes to reduce pressure waves in comparison with an analogous operation without the random variation.

6. The method as claimed in claim 1, wherein the random variation of the setpoint fuel mass takes place for each of the cylinders in such a way that a sum of the setpoint fuel masses which are to be injected in all the injection processes remains unchanged for the respective cylinder.

7. The method as claimed in claim 1, wherein said method also includes generating a fault message as a function of a value of a sum of the split factors.

8. A device for operating an internal combustion engine comprising a plurality of cylinders,
   wherein said device is configured to carry out the method as claimed in claim 1.

9. A method, comprising:
   split injecting fuel in two or more injection processes into a cylinder during a single combustion cycle; and
   randomly varying at least one of the two or more injection processes, wherein the randomly varying includes randomly varying a fuel injection mass away from a setpoint fuel mass for at least two injection processes to reduce pressure waves in comparison with an analogous operation without the random variation.

10. The method of claim 9, wherein the randomly varying further includes randomly varying one or more of an injection timing and an injection duration.

11. The method of claim 10, wherein the randomly varying includes randomly varying a fuel injection mass of a first injection process of the two or more injection processes, and further comprising adjusting a fuel injection mass of a second injection process of the two or more injection processes based on, and to compensate for, the random variation of the first injection process, where a desired total amount of injected fuel is maintained for the two or more injection processes even with the random variation.

12. The method of claim 10, wherein the randomly varying includes randomly varying the injection timing of one of the two or more injection processes.

13. A method, comprising:
split injecting fuel in a first fuel mass and a second fuel mass to a cylinder during a first cylinder cycle;
randomly varying a split ratio of the first fuel mass relative to the second fuel mass for each of a plurality of subsequent cylinder cycles; and
injecting a third fuel mass during the first cylinder cycle, the third fuel mass maintained over each of the plurality of subsequent cylinder cycles.

14. The method of claim 13, wherein randomly varying the split ratio comprises randomly adjusting the first fuel mass and adjusting the second fuel mass to compensate for the adjustment to the first fuel mass.

15. The method of claim 14, wherein adjusting the first fuel mass comprises adjusting the first fuel mass by less than a threshold amount from an initial setpoint fuel mass.

16. The method of claim 14, further comprising setting the initial setpoint fuel mass based on engine operating conditions.

17. The method of claim 13, wherein a total mass of fuel injected to the cylinder remains constant over each of the plurality of subsequent cylinder cycles.

* * * * *